3,040,252
RADIO ENERGY MEASURING DEVICE
Warren D. Novak, Chappaqua, N.Y., assignor to the United States of America as represented by the Secretary of the Air Force
Filed Nov. 14, 1957, Ser. No. 696,574
5 Claims. (Cl. 324—95)

This invention relates to the transformation of radio frequency energy to heat energy for the purpose of radio frequency power measurement and more particularly to an improved device for such conversion capable of highly efficient operation over a wide band of frequencies.

One of the major advantages of the present invention is that it may be used for measuring radio frequency energy of numerous waveguide installations covering a wide range of frequencies and power output without the need for additional special load or impedance matching devices. A practical example of the importance of this desirable advantage may be found in the testing of existing Air Force installations of high power search and height finding radar. One of such installations may consist of five or more transmitters with power in the order of a megawatt each, all using variable frequency magnetrons. To take power output measurements on these transmitters using conventional, fixed frequency loads, would necessitate the building of an undesirably expensive number of loads and associated impedance matching devices. On the other hand, the present invention permits power measurements to be made on all of the transmitters, regardless of the frequency, with the one single device and without the need for additional impedance matching.

Accordingly, a primary object of the present invention is the provision of a device for measurement of radio frequency power output over a wide range of frequencies and power without the need for additional equipment.

Another object is the provision of a radio frequency waveguide load capable of maintaining a low standing wave ratio over a wide band of frequencies.

A further object is the provision of a waveguide radio frequency load requiring no additional impedance matching devices over a wide range of frequencies in the waveguide.

And another object is the provision of a waveguide radio frequency load of a type eliminating the need for holes or slots of any kind in the waveguide walls.

Still another object is the provision of a waveguide radio frequency load which eliminates the problems of arcing due to discontinuities in waveguide walls as well as the use of strut tuner plungers or impedance matching irises in waveguides.

And a further object is the provision of a waveguide radio frequency load which eliminates inaccuracies in power measurement due to openings for escape of radio frequency energy or by interference in adjacent test positions.

And another object is the provision of a radio frequency power measuring device which permits direct full power measurement in the waveguide without the need for directional couplers or attenuating accessories, nor periodic calibration of attenuating accessories of any kind.

These objects, features and advantages are achieved generally by providing in the waveguide, an elongated housing of dielectric material having a tapered section terminating in a point and having a chamber with an inlet and outlet for passage of fluid through the chamber and means for measuring the heat absorbed by said fluid.

By making the chamber of the same shape as the tapered section of the housing and facing in the direction the source of radio frequency energy, highly efficient conversion of radio energy to heat energy with a low standing wave ratio is achieved.

By providing the inlet with an extension directing inflowing fluid first to the point of the taper, greater power dissipating capacity without overheating of components is thereby achieved.

By making the length of the tapered section long in comparison to the wavelength of the radio energy, a negligibly low reflection of radio energy back down the waveguide is achieved.

By arranging the inlet and outlet in a manner to insure the existence of fluid at the point before any leaves the outlet, maximum protection against component injury from heat energy is achieved.

These and other objects, features and advantages will become more apparent from the following description taken in connection with the accompanying drawings of a preferred embodiment of the invention, and wherein.

Figure 1:
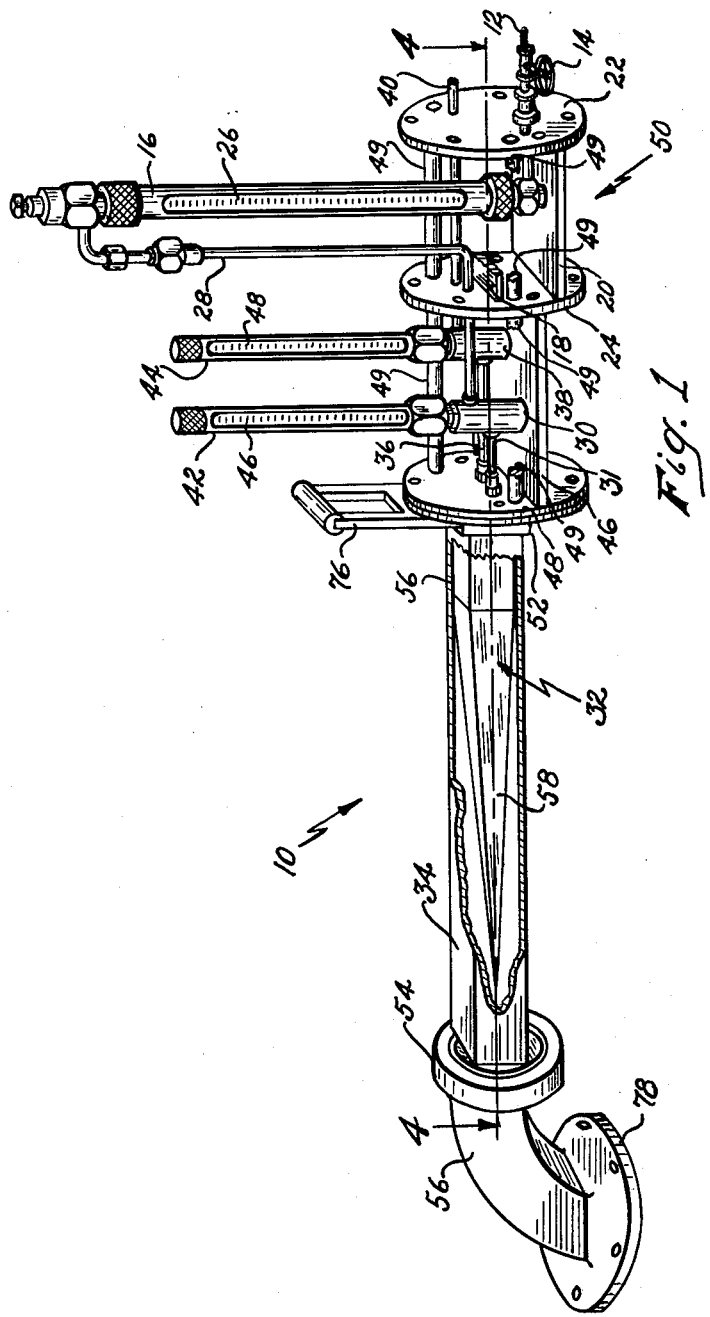
FIGURE 1 is an isometric representation of a radio frequency power measuring device made in accordance with the present invention and having partially cutaway sections to more clearly show construction.

Referring to FIGURE 1 in more detail, a radio frequency power measuring device made in accordance with the present invention is designated generally by the numeral 10. The radio frequency power measuring device 10 has a plumbing connection 12 for admitting radio energy dissipating fluid such as water through a valve 14 to a fluid flow meter 16. The flow meter 16 is suitably anchored in plates 18 and 20 which are rigidly fixed as spacers between the circular mounting disks 22 and 24. The flow meter 16 has calibrations 26 for reading directly the volumetric flow of fluid from valve 14 through a tube 28, thermometer well 30 and a tube 31 to an elongated pyramidal or conical radio frequency load structure 32 in a waveguide 34. Fluid leaves the load structure 32 through a tube 36 to a thermometer well 38, and from the thermometer well 38 through a tube 40 for suitable disposal. Each of the wells 30 and 38 have thermometers 42 and 44 with temperature calibrations 46 and 48 respectively for direct reading of inlet and outlet temperatures of the fluid circulating through the load 32. The wells 30 and 38 are preferably fixed to a plate 46 held as a spacer between a circular support disk 48 and the disk 24. The support disks 22, 24 and 48 together with the spacer rods 49, thermometers 42 and 44 and flow meter 16 form a heat energy measuring arrangement 50 for use as will hereinafter be more fully described.

The waveguide 34 which houses the load housing structure 32 may be of conventional waveguide design coupled at one end by a coupling disk 52 to the support disk 48 and at the other end by a conventional coupling 54 to an elbow 56 or other suitable waveguide structure for connecting directly to the system of a radio frequency source (not shown) whose power output is to be measured.

Figure 2:
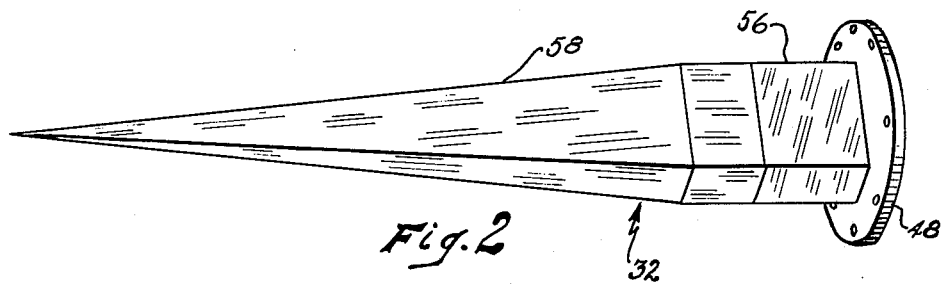
FIGURE 2 is an isometric representation of a radio frequency load housing made in accordance with the present invention and used in FIGURE 1.
Figure 3:
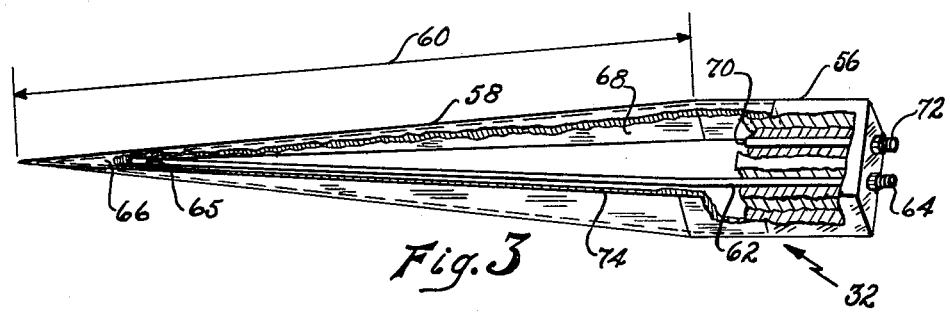
FIGURE 3 is an isometric diagram of the housing shown in FIGURE 2 and having a cutaway section to more clearly show construction.

Referring to FIGURES 1, 2 and 3, the load structure 32 is made of a dielectric material such as polystyrene or Lucite and has preferably a base portion 56 and a pyramidal or conical portion 58. The base portion 56 has a cross sectional configuration the same as that of the waveguide 34 so as to be a close fit therein to provide proper support for and alignment of the axis of the pyramid 32 with the axis of the waveguide 34. The length 60 (FIGURE 3) of the pyramidal section 58 is preferably greater than the wavelength of the radio frequency whose energy is to be measured. A particularly suitable length 60 is one which is five times or more greater than the wavelength of the center band frequency of the range over which the load 32 is to be used. For example, in the ten centimeter wavelength range the length 60 should be about twenty five inches.

Referring to FIGURE 3, the load 32 has internally thereof a tube 62 having one end fixed in the base portion 56 in communication with an inlet nipple 64, and the other end 65 opening at the point or apex 66 of the pyramidal section 58. Thus, fluid from the thermometer well 30 and tube 31 enters the tube 62 through the nipple 64 and is directed by thread 65 first to the apex 66 before circulating to the back of the chamber 68 and leaving the housing structure 32 through a second tube 70 communicating with the back end of the pyramidal section 58 and an outlet nipple 72. The outlet nipple 72 is connected to the tube 36 leading to the thermometer well 38. The tubes 62 and 70 may be of the same dielectric material as that of which the housing structure 32 is made. The outlet 70 is preferably so positioned with respect to the apex 66 that fluid will fill the apex 66 before any flows from the outlet 70. The walls 74 of the housing structure 32 are preferably thin and uniform so that the chamber 68 is of the same pyramidal configuration as the pyramidal section 58.

A handle 76 is fixed to the support disks 48 and 52 for easy portability of the power measuring unit 10.

In operation, the radio frequency power measuring unit 10 is first fixed directly by means of the coupling flange 78 to the waveguide of a radio frequency generating unit as a radar. A suitable procedure would be to remove the radar antenna and to fasten the coupling flange 78 of the elbow 56 in its place so that the radar unit terminates in the power measuring device 10. A radio energy dissipating fluid as water is then supplied through the valve 15, flow meter 16, well 30, tube 31, nipple 64, and tube 62 to the apex 66 of the radio frequency load housing 32. The water will then circulate back in chamber 68 and flow out through tube 70, nipple 72, tube 36, well 38 and tube 40 for suitable disposal.

While the water is in chamber 68 it completely dissipates the radio energy reaching it from the radar unit. Because of the pyramidal or conical shape of the water load in the housing structure 32, negligible reflection of radio energy will occur and virtually all of it will be transformed into heat energy raising the temperature of the water in the chamber 68. Such transformation is enhanced by proper positioning of the end 65 of the tube 62 for suitable direction of the fluid to the apex 66.

Because of the inflowing water reaching the apex 66 first where heat concentration is greatest, large power loads may be dissipated without injuring the material used in the walls 74 at the apex 66.

The amount of radio frequency energy absorbed by the water is a direct function of the rate of flow and temperature rise of the water moving through the load housing 32. Thus, the radio frequency power output of the transmitter may be determined immediately upon observing the water flow rate on the flow meter 16 and corresponding temperature differential at thermometers 42 and 44 and placing these two parameters in the relation:

$$P_{peak} = 264 \cdot v \cdot \Delta t \quad (1)$$

where, $P_{peak}$=Radio frequency peak power output in kilowatts.
$v$=Water flow rate in gallons/minute.
$\Delta t$=Temperature differential in ° C.

If average power is desired, it may be obtained from the relation:

$$P_{av} = \frac{P_{peak}}{PW \cdot RR} \quad (2)$$

where, $P_{av}$=Average radio frequency power output in watts.
$P_{peak}$=Peak radio frequency power output in kilowatts.
$PW$=Pulse width in microseconds.
$RR$=Pulse repetition rate in pulses/second.

Figure 4:
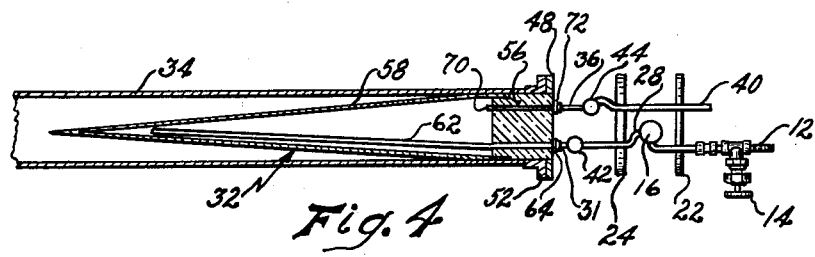
FIGURE 4 is a cross section on line 4—4 of the embodiment shown in FIGURE 1 with only some of the components shown for clarity of illustration.
Figure 5:
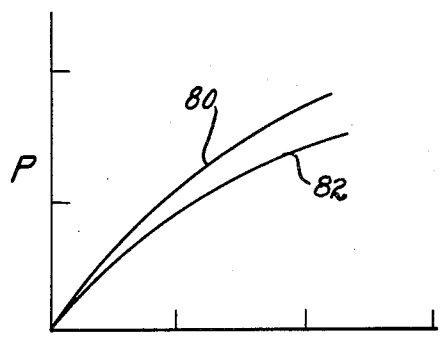
FIGURE 5 is a graph for illustrating operation of the device shown in FIGURE 2.

For a given radar transmitter whose pulse width and repetition rate are fixed known values, the relations (1) and (2) above may be plotted as power, P, versus $\Delta t$ for several different values of $v$ over a range of anticipated power output as shown in FIGURE 4, where the curves 80 and 82 are for volumetric rates $v_1$ and $v_2$ respectively. From these curves it is possible to read quickly the corresponding average or peak power output for any combination of $v \cdot \Delta t$.

The accuracy of the power measurement thus becomes a function of the accuracy to which the water temperature and flow rate can be measured. Thermometers 42 and 44 are readily available which are capable of reading water temperature to .01 degree centigrade. Flow meters as 16 can be read to .001 gallon per minute. Thus, this combination allows measurements of radio frequency peak power for a one megawatt transmitter to be made with an error of less than ½ of 1%.

The fact that water is maintained in a conical shape when it is presented to the radio frequency energy, is the key to the design of the present load housing 32. It is also a key to its ability to maintain a low standing wave ratio over a wide band of frequencies. An average standing wave ratio of 1.06 or better has been achieved by a water load 32 which is 25 inches long.

It will be noted that the power measuring unit 10 is complete in itself and does not require additional equipment for tuning or impedance matching in each different transmitter under test.

This invention is not limited to the specific details of construction and operation described as equivalents will suggest themselves to those skilled in the art.

What is claimed is:

1. In a wide band electromagnetic wave energy dissipating device for a hollow waveguide, the combination of an elongated housing having a tapered section, a single tapered chamber internally of the housing, said single chamber having a cross-sectional area that increases progressively and linearly to a maximum cross-sectional area substantially equal to the cross-sectional area of the waveguide, and conforms to the general shape of said tapered section, means for establishing a two-directional fluid flow path within said single tapered chamber, said means comprising an inlet and outlet for passage of fluid in and out of said chamber, said inlet directing said fluid toward the smaller end of said tapered chamber, and means supporting said housing in the hollow of said waveguide with said tapered section in the path of said electromagnetic energy and with the smaller end of said tapered section facing in the direction of the source of said electromagnetic energy.

2. The combination as in claim 1, wherein said tapered section is of a length greater than the wavelength of the waves in said electromagnetic energy.

3. The combination as in claim 1, wherein said tapered chamber terminates in an apex and said inlet includes means for directing said fluid first to said apex.

4. In a wide band electromagnetic wave energy dissipating device for a hollow waveguide, the combination of a thin walled, pyramidal, polyhedron type housing of dielectric material and means supporting said housing in the hollow of said waveguide, said thin wall forming an interior cavity for water, an apex at one end of the housing, a peripheral configuration at the other end of said housing providing a cavity area whose transverse extent is substantially equal to the cross-sectional area of the hollow of said waveguide, said apex facing in the direction of the source of said electromagnetic wave energy, an inlet and outlet in the wall of the housing for the flow of water into and out of the interior cavity, and a tube of dielectric material extending from said inlet through said cavity to said apex for directing the inflowing water to the apex.

5. A radio frequency power measuring device for a hollow waveguide comprising the combination of an elongated housing of dielectric material and having a tapered section, means supporting said housing in the hollow of said waveguide in the path of said radio frequency power, a chamber internally of the housing conforming to the general shape of said tapered section, said chamber having a cross-sectional area that increases linearly to a maximum that is substantially equal to the cross-sectional area of the waveguide, the smaller end of said tapered section facing in the direction of the source of said radio frequency power, means for establishing a two-directional fluid flow path within said single tapered chamber, said means comprising an inlet and an outlet for passage of fluid in and out of said chamber, said inlet directing said fluid toward the smaller end of said tapered chamber, means for measuring the temperature of said fluid at said inlet and outlet and means for measuring the volumetric rate of fluid flow through said chamber.

References Cited in the file of this patent

UNITED STATES PATENTS

| 2,399,930 | Keister | May 7, 1946 |
| 2,446,932 | Johnson | Aug. 10, 1948 |
| 2,881,399 | Leyton | Apr. 7, 1959 |

OTHER REFERENCES

Clogston: Patent abstract 608,291, 608 O.G. 609, Oct. 12, 1950.

Publication: Article by Samuel Freedman published in "Radio-Electronic Engineering," May 1954, pages 14, 15 and 35.